United States Patent
Lutz

[11] Patent Number: 6,089,780
[45] Date of Patent: Jul. 18, 2000

[54] TIGHTENING AND CLAMPING DEVICE

[75] Inventor: Christian Lutz, Nüziders, Australia

[73] Assignee: Etablissement Supervis, Vaduz, Liechtenstein

[21] Appl. No.: 09/067,501

[22] Filed: Apr. 27, 1998

[30] Foreign Application Priority Data

Apr. 29, 1997 [DE] Germany .............................. 197 18 031

[51] Int. Cl.[7] .................................................. B25G 3/18
[52] U.S. Cl. ........................ 403/322; 403/639; 403/405.1
[58] Field of Search .............................. 74/493; 280/775; 403/322.1, 322.3, 322.4, 373, 374.1, 374.2, 374.5, 639, 405.1

[56] References Cited

U.S. PATENT DOCUMENTS

| 3,665,778 | 5/1972 | Bohan et al. ......................... 74/492 X |
| 4,399,898 | 8/1983 | Olschewski et al. ................. 192/98 X |
| 4,715,753 | 12/1987 | Tack ................................... 409/234 X |
| 4,788,880 | 12/1988 | Kester ....................................... 74/493 |
| 4,911,574 | 3/1990 | VanderPol et al. ..................... 403/373 |
| 5,088,767 | 2/1992 | Hoblingre et al. ..................... 280/775 |
| 5,507,587 | 4/1996 | Matsumoto ......................... 403/369 X |
| 5,606,891 | 3/1997 | Tisell et al. .............................. 74/493 |
| 5,606,892 | 3/1997 | Hedderly ................................. 74/493 |
| 5,687,990 | 11/1997 | Uphaus ................................. 280/775 |
| 5,785,461 | 7/1998 | Lambert ........................... 403/405.1 X |
| 5,787,759 | 8/1998 | Olgren ..................................... 74/493 |
| 5,921,577 | 7/1999 | Weiss et al. ............................ 280/775 |
| 5,927,152 | 7/1999 | Marzio et al. ............................ 74/493 |

FOREIGN PATENT DOCUMENTS

| 0493181 | 7/1992 | European Pat. Off. ............... 403/322 |
| 0600700 | 6/1994 | European Pat. Off. ............... 403/322 |

*Primary Examiner*—Lynne H. Browne
*Assistant Examiner*—Brian Buck
*Attorney, Agent, or Firm*—Brown & Wood, LLP

[57] ABSTRACT

A tightening and clamping device including a shaft, first and second abutments supported on the shaft in a spaced relationship to each other, and an actuation member rotatable about an axis of the shaft between a tightening and clamping position and a release position and operatively connected with the second abutment, the actuation member and the second abutment having adjacent surfaces, with an adjacent surface of the actuation member or the second abutment being provided with rolling tracks and with rolling bodies being supported for a free rotation in another of the actuation member and the second abutment and displaceable along the rolling tracks, and detent elements acting in a radial direction for locking the actuation member and the second abutment relative to each other at least in one of the tightening and clamping position and the release position.

14 Claims, 3 Drawing Sheets

TIGHTENING AND CLAMPING DEVICE

BACKGROUND OF THE INVENTION

1. Field of the Invention

The present invention relates to a tightening and clamping device including a shaft, a first abutment supported on one end of the shaft, a second abutment supported on the shaft in a spaced relationship to the first abutment, an actuation member rotable about an axis of the shaft between a tightening and clamping position and a release position and operatively connected with the second abutment, the actuation member and the second abutment having adjacent surfaces, with an adjacent surface of one of the actuation member and the second abutment being provided with rolling tracks, and with rolling bodies being supported for a free rotation in another of the actuation member and the second abutment and being displaceable along the rolling tracks.

2. Description of the Prior Art

A tightening and clamping device of this type is disclosed, e.g., in a European Publication EP 0 600 700 BI. The rolling tracts, discussed in this publication, have three sections, namely, a first section along which a rolling body is displaceable in the unclamped position, a second section which represents a culminating point through which the rolling body must pass upon actuation of the actuation member, and a third section representing or forming the detent region in the clamped position of the device. The supporting surface of the detent region lies deeper than the culmination point and, as a result, during the transition from the unclamped position into the clamped position, the maximum achievable tension force, which is achieved at the culmination point, is again reduced when the rolling body moves into its detent position. Therefore, a portion of the tension force becomes lost.

European Publication EP 0 493 181 BI discloses a tightening and clamping device of the type discussed above in which a ball pair is used as the rolling bodies. The balls are located in the bores formed in the actuation member which pivots between two abutments. Upon pivoting of the actuation member, the rolling bodies, the balls, are displaced along rolling tracks formed as helicoidal surfaces. In the tightening and clamping position, the rolling bodies lie in recesses formed in the rolling tracks. Thus, the structure described in this publication has the same drawback which was discussed when describing the device disclosed in EP 0 600 700 BI.

An object of the present invention is to provide a tightening and clamping device of the type discussed above and in which the drawback characterizing the prior art devices is eliminated, and the maximum achievable magnitude of the tightening and clamping force is retained in the tightening and clamping position.

SUMMARY OF THE INVENTION

These and other objects of the present invention, which will become apparent hereinafter, are achieved by providing detent means, which act in a radial direction, for locking the actuation member and the second abutment relative to each other at least in one of the tightening and clamping positions and the release position and, preferably in the tightening and clamping position.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
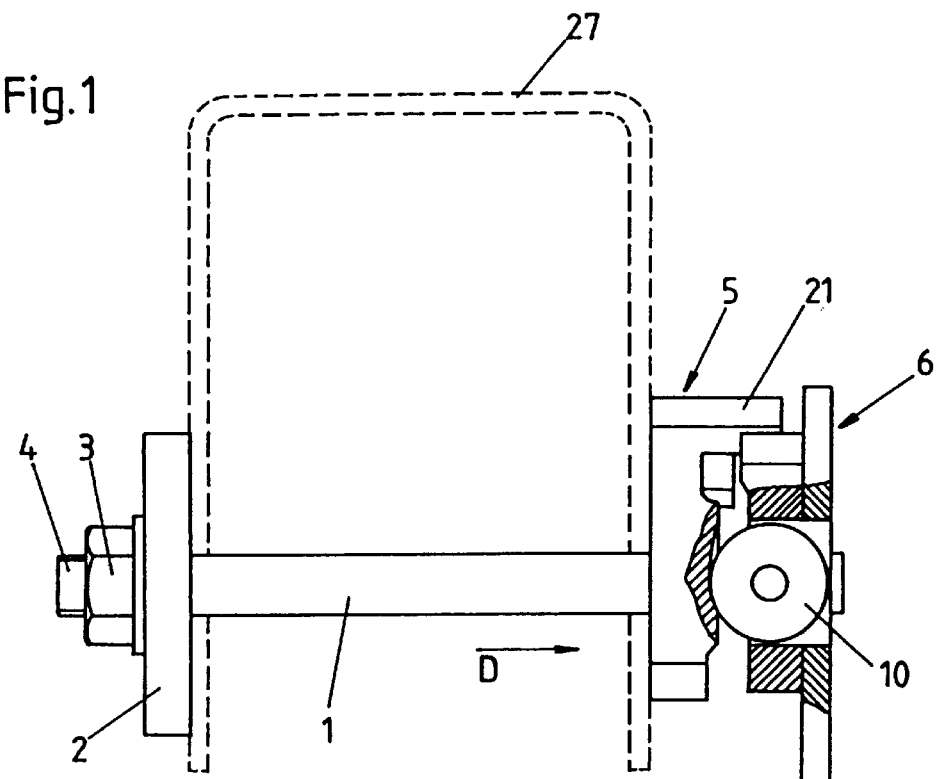
FIG. 1 shows a side elevational, partially cross-sectional view of a tightening and clamping device according to the present invention.

A tightening and clamping device according to the present invention, which is shown in FIG. 1, includes a shaft 1. At one end of the shaft 1, there is provided an abutment 2 which is secured on the end 4 of the shaft 1 with, e.g., a nut 3 which is screwed on the shaft end provided with an outer thread. The tightening and clamping device further includes a second abutment 5 which is spaced from the first abutment 2 and through which the shaft 1 extends with a small clearance so that it can rotate relative to the second abutment 5. An actuation member 6, which is provided with an actuation lever 7, cooperates with the second abutment 5. The actuation member 6 is connected with the shaft 1 for joint rotation therewith.

A surface 8 of the actuation member 6, which is adjacent to the second abutment 5, has two cavities 9 which are symmetrically arranged with respect to the shaft 1. Freely rotatable cylindrical bodies 10, which are formed as cylindrical rollers, are located in these two cavities. At that, the rolling bodies 10 project somewhat beyond the surface 8. The axes of the rolling bodies 10 are aligned and intersect the axis of the shaft 1. A gear wheel 12 is fixedly supported on a sidewise projecting section 11 of the actuation member 6. The gear wheel 12 forms part of a hydraulic damping or braking device 13. The actuation member 6 is provided at its edge with two hump-shaped stops 14. An end 16 of the plate spring 15 is secured to the actuation member 6 at its circumferential region between the two stop 14. The plate spring 15 has a wedge-shaped projection 17 which extends parallel to the axis of the shaft 1 with the wedge peak facing the axis.

The somewhat disc-shaped second abutment 5 has a bore 18 through which the shaft 1 extends with a clearance. On both sides of the bore 18, there are formed helicoidal rolling tracks 19. A portion of the circumference of the second abutment 5, the length of which corresponds to the pivotal angle of the actuation member 6, is provided with an end toothing 20. Two sidewise projecting claws 21 are provided on the second abutment 5. Further, on the surface 24 of the second abutment 5 on which the rolling tracks 19 are formed, there is provided a cam 22 projecting beyond this surface 24. The outer peripheral surface 23 of the cam 22 is spiral-shaped. The dimensions of the cam 22 and the spring 15 or their arrangement relative to each other are so selected that the spring 15 or a portion of the spring 15 projects into the generating curve of the spiral-shaped peripheral surface 23 of the cam 22.

Upon assembly of the tightening and clamping device, the surface 8 of the actuation member 6 is located opposite to the surface 24 of the second abutment 5, with the claw 21 lying between the stops 14 of the actuation member 6. The rolling bodies 10 lie on the rolling tracks 19.

Figure 11:
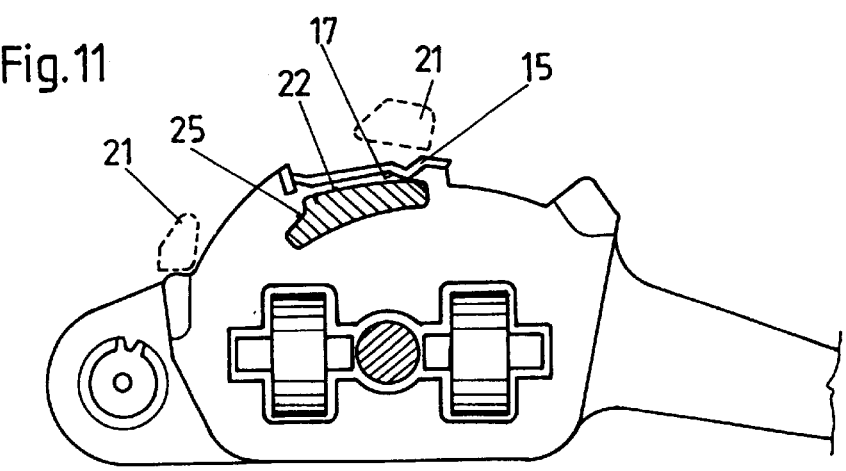
FIG. 11 shows a view similar to that of FIG. 7 but with the wedge-shaped projection engaging the cam in the first adjustment position of the actuation member.
Figure 2:
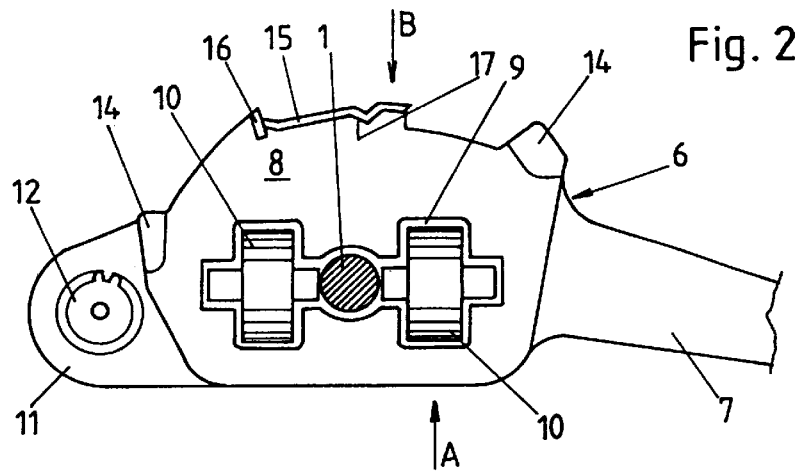
FIG. 2 shows an elevational view of the actuation member of a tightening and clamping device.
Figure 3:
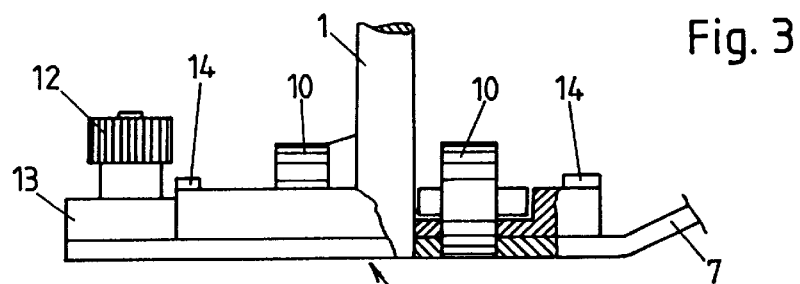
FIG. 3 shows a side view in the direction of arrow A of the actuation member shown in FIG. 2.
Figure 4:
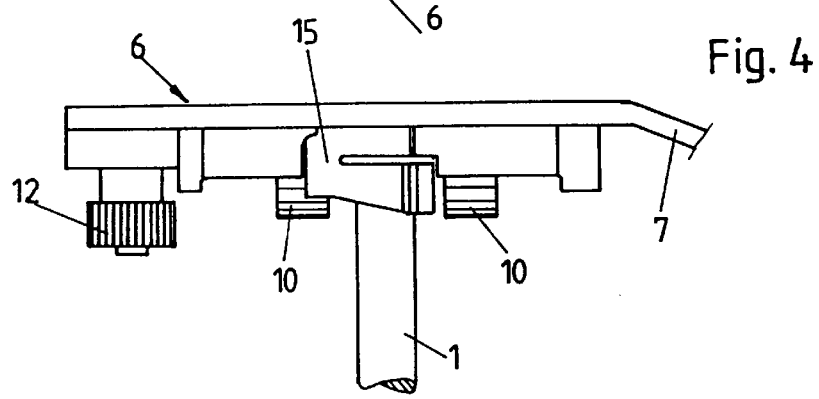
FIG. 4 shows a side view in the direction of arrow B of the actuation member shown in FIG. 2.
Figure 5:
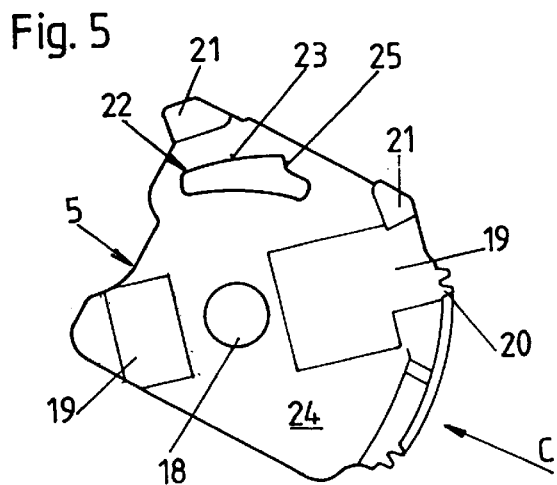
FIG. 5 shows a plan view of the second abutment.
Figure 6:
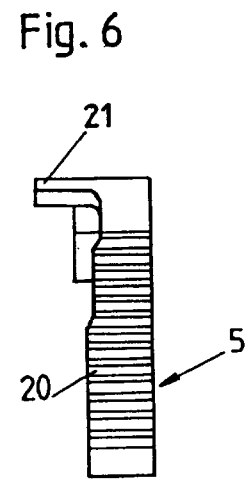
FIG. 6 shows a side view in the direction of arrow C of the second abutment shown in FIG. 5.
Figure 7:
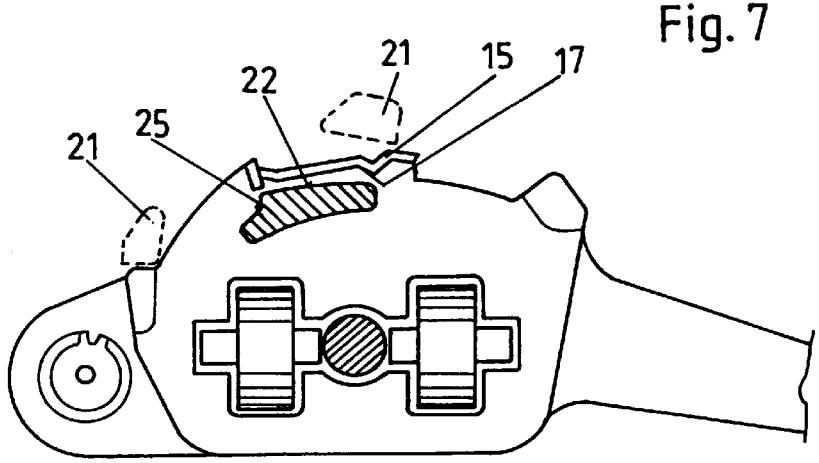
FIG. 7 shows an elevational view of the actuation member of a tightening and clamping device according to the present invention and similar to that of FIG. 2 but together with a cam which is shown in a position corresponding to a first position of the actuation member.

FIG. 7 shows only the position of the spring 15 and the cam 22 relative to each other in an unclamped, release position of the tightening and clamping device. Here, the spring 15 is somewhat spaced from the cam 22 when holding is released. However, it is also possible to so design the device that even when the holding is released, the spring 15, if pre-loaded, engages the cam 22, which is shown schematically in FIG. 11. A relative rotation of the spring 15 and the cam 22 results in radial deflection of the spring 15 and thereby in its tensioning. At that, the spring 15 can either engage the cam 22 along the entire cam length or along only a portion of the cam length. Dependent on the construction, the force ratio will be influenced by the pivotal movement of the parts relative to each other.

Figure 8:
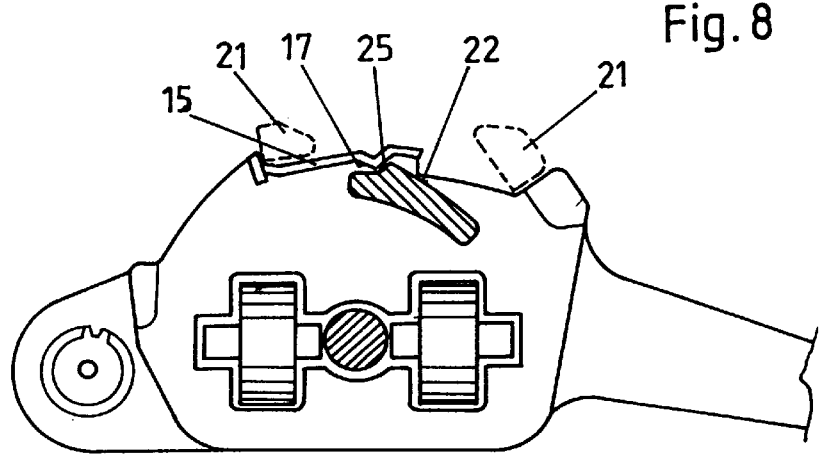
FIG. 8 shows an elevational view of the actuation member of a tightening and clamping device according to the present invention and similar to that of FIG. 2 but together with a cam which is shown in a position corresponding to a second position of the actuation member.
Figure 9:
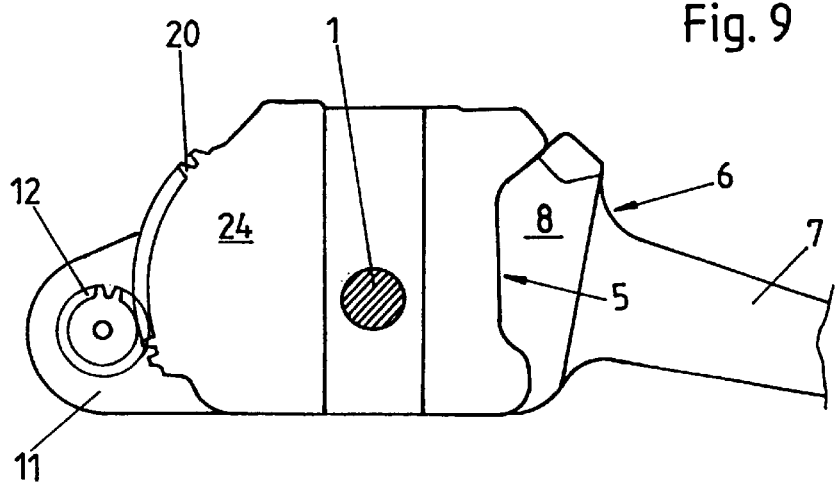
FIG. 9 shows an elevational view of the second abutment and the actuation member in the direction of arrow D in FIG. 1.

To actuate the tightening and clamping device, the actuation member 6 is pivoted with the actuation lever 7 toward the stationary second abutment 5, which causes the rolling bodies 10 to run up, in a per se known manner, on the helicoidally-shaped rolling tracks 19. At that, the cam 22 is displaced into the region of the spring 15, and the projection 17 of the spring 15 extends into the generating curve of the cam 22. This causes lifting of the spring 15 which is deflected radially outwardly until the peripheral surface 23 of the cam 22 completely passes the wedge-shaped projection 17, as shown in FIG. 8. Thereafter, the spring 15 moves back inward and prevents the cam 22 from moving back, serving as a detent. At that, the claws 21 achieved their end position. In FIGS. 7 and 8, the claws and their respective positions are shown with dash lines. The pivotal movement of two parts relative to each other increases the axial distance between the actuation member 6 and the second abutment 5 which results from the rolling bodies 17 running up the helicoidally-shaped rolling tracks.

During the pivotal movement of the spring 15 and the cam 22, the gear wheel 12 is driven by the end toothing 20. This gear wheel 12 is operatively connected with the damping or braking device 13, and the actuation member 6 is pivoted by the actuation lever 7 against always uniformly acting force.

If the tightening and clamping device need be released, the actuation member 6 is pivoted with the actuation lever 7 to its initial position. At that, the inclined shoulder 25 of the cam 22 lifts the spring 15, whereby the holding is released.

In the embodiment shown in the drawings, the spring 15 lies, when viewed from the axis of the shaft 1, externally of the cam 22. It is within the scope of the present invention, to locate the spring 15 inwardly of the cam 22 so that the spring 15 is spaced from the axis of the shaft 1 by a radial distance smaller than the radial distance by which the cam 22 is spaced from the axis of the shaft 1, with the cam 22 still able to perform its function. Though the rolling bodies 10 are arranged in the actuation member 6 in the embodiment shown in the drawings, it is possible arranged the rolling bodies 10 in the second abutment 5 and form the rolling tracks in the actuation member 6. Instead of the plate spring 15, which extends in a circumferential direction and has its end 16 secured to the actuation member 6, a spring acting in a radial direction can be used which would act through an intermediate member (a ball) serving as a detent element.

The helicoidally-shaped rolling tracks can be somewhat coiled, so that the contract points of the rolling bodies and the rolling track would be located on a spiral, the axis of which is the axis of the shaft 1, during the pivotal movement of the actuation member 6 and the second abutment 5 relative to each other. The coiling of the rolling track is so effected that the rolling body, in the tightening and clamping position of the device, is located, at the end of its rolling path, as close to the shaft as possible, and that it is located remotely from the shaft axis in the release position of the device. The amount of the coiling is very small and is not shown in the drawings.

Figure 10:
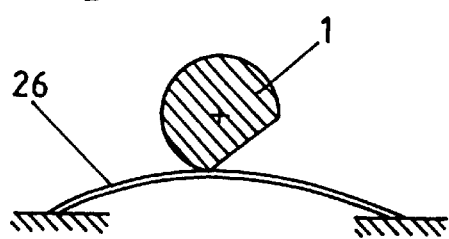
FIG. 10 shows a cross-sectional view of the shaft of another embodiment (not shown) of a tightening and clamping device according to the present invention.

The dash line 27 in FIG. 1 designates a U-shaped workpiece, which may represent, e.g., a portion of an adjustable steering column of a motor vehicle, as shown and described in the references mentioned in the description of the prior art at the beginning of the specification. Between the two abutments 2 and 5 and the cheeks of the U-shaped workpiece, spring packages can be provided. The shaft 1 is preferably formed as a yielding screw. In the embodiment described above, the actuation member 6 is secured to the shaft for joint rotation therewith. However, it is also possible to flatten a section of the shaft 1, and to provide a spring, such as a spring 26, which would engage the flattened surface (please see FIG. 10) and which would support the shaft 1 at least along a portion of its pivotal path. This is shown schematically in FIG. 10.

Important for the present invention is the ratchet detent which acts in a radial direction and which locks the two pivotable relative to each other parts in their tightening and clamping position. The force for overcoming the detent is provided only by the actuation lever 7. The retaining force, which is generated by the ratchet detent has no influence on the tightening and clamping device.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A tightening and clamping device, comprising:
  a shaft;
  a first abutment supported on one end of the shaft;
  a second abutment supported on the shaft in a spaced relationship to the first abutment;
  an actuation member rotatable about an axis of the shaft between a tightening and clamping position and a release position and operatively connected with the second abutment, the actuation member and the second abutment having adjacent surfaces, with an adjacent surface of one of the actuation member and the second abutment being provided with rolling tracks;

rolling bodies supported for a free rotation in another of the actuation member and the second abutment and displaceable along the rolling tracks; and detent means having spring means acting in a radial direction for locking the actuation member and the second abutment relative to each other at least in the tightening and clamping position of the actuation member.

2. A tightening and clamping device as set forth in claim 1, wherein the detent means comprises:

a cam provided on the adjacent surface of the one of the actuation member and the second abutment, projecting toward the adjacent surface of the another of the actuation member and the second abutment, and having a spiral-shaped peripheral surface extending in a circumferential direction; and a spring provided on the adjacent surface of the another of the actuation member and the second abutment, facing the spiral-shaped peripheral surface of the cam, and having at least a portion thereof projecting into a generating curve of the spiral-shaped peripheral surface of the cam.

3. A tightening and clamping device as set forth in claim 2, wherein an arc length of the spiral-shaped peripheral surface of the cam is equal to approximately 40°.

4. A tightening and clamping device as set forth in claim 2, wherein the spring comprises a plate spring having a wedge-shaped projection extending parallel to an axis of the shaft and facing the cam.

5. A tightening and clamping device, comprising:

a shaft;

a first abutment supported on one end of the shaft;

a second abutment supported on the shaft in a spaced relationship to the first abutment;

an actuation member rotatable about an axis of the shaft between a tightening and clamping position and a release position and operatively connected with the second abutment, the actuation member and the second abutment having adjacent surfaces, with an adjacent surface of one of the actuation member and the second abutment being provided with rolling tracks;

rolling bodies supported for a free rotation in another of the actuation member and the second abutment and displaceable along the rolling tracks; and detent means acting in a radial direction for locking the actuation member and the second abutment relative to each other at least in one of the tightening and clamping position and the release position, wherein a circumference of one of the actuation member and the second abutment is provided, along an arc length thereof which at least corresponds to an adjustment path of the actuation member, with an end toothing, and wherein another of the actuation member and the second abutment has a gear wheel fixedly secured thereon and cooperating with the end toothing.

6. A tightening and clamping device, comprising:

a shaft;

a first abutment supported on one end of the shaft;

a second abutment supported on the shaft in a spaced relationship to the first abutment;

an actuation member rotatable about an axis of the shaft between a tightening and clamping position and a release position and operatively connected with the second abutment, the actuation member and the second abutment having adjacent surfaces, with an adjacent surface of one of the actuation member and the second abutment being provided with rolling tracks;

rolling bodies supported for a free rotation in another of the actuation member and the second abutment and displaceable along the rolling tracks; and detent means acting in a radial direction for locking the actuation member and the second abutment relative to each other at lease in one of the tightening and clamping position and the release position, wherein a cross-section of the shaft, at least along a portion of a circumference thereof, has a flattened section, and wherein the device further comprises a spring engaging the flattened section.

7. A tightening and clamping device as set forth in claim 5, wherein the gear wheel forms part of a damping and braking device.

8. A tightening and clamping device as set forth in claim 1, further comprising stops for limiting the adjustment path of the actuation member.

9. A tightening and clamping device as set forth in claim 6, wherein at least portions of the stops, which limit the adjustment path of the actuation member, are formed by claws provided on the second abutment and projecting therefrom.

10. A tightening and clamping device as set forth in claim 9, wherein the spring is pre-loaded.

11. A tightening and clamping device as set forth in clamp 2, wherein the spring engages the cam in both tightening and clamping and release positions of the actuation member.

12. A tightening and clamping device as set forth in 11, wherein the spring is pre-loaded even in the release position of the actuation member.

13. A tightening and clamping device as set forth in claim 2, wherein the spiral-shaped peripheral surface of the cam has at least one of a detent-shaped recess and a shoulder engageable by the spring in the tightening and clamping position.

14. A tightening and clamping device as set forth in claim 1, wherein the rolling bodies are formed as cylindrical rollers.

* * * * *